United States Patent [19]
Narushima

[11] Patent Number: 6,027,202
[45] Date of Patent: Feb. 22, 2000

[54] INK JET PRINTER AND ITS HEAD DEVICE

[75] Inventor: Toshio Narushima, Kanagawa, Japan

[73] Assignee: Sony Corporation, Japan

[21] Appl. No.: 08/973,160

[22] PCT Filed: Apr. 4, 1997

[86] PCT No.: PCT/JP96/01176

§ 371 Date: Nov. 19, 1997

§ 102(e) Date: Nov. 19, 1997

[87] PCT Pub. No.: WO97/37854

PCT Pub. Date: Oct. 16, 1997

[30] Foreign Application Priority Data

Apr. 4, 1996 [JP] Japan .................................. 8-082201

[51] Int. Cl.[7] .................................................. B41J 2/145
[52] U.S. Cl. .................................................. 347/40
[58] Field of Search .................................. 347/40, 41, 43

[56] References Cited

U.S. PATENT DOCUMENTS

| | | | |
|---|---|---|---|
| 4,533,928 | 8/1985 | Sugiura et al. | 347/43 X |
| 4,540,996 | 9/1985 | Saito | 347/43 |
| 4,656,505 | 4/1987 | Yamada et al. | 358/529 X |
| 5,371,529 | 12/1994 | Eguchi et al. | 347/7 |

FOREIGN PATENT DOCUMENTS

| | | |
|---|---|---|
| 58-194544 | 11/1983 | Japan . |
| 45349 | 2/1991 | Japan . |
| 4-19029 | 3/1992 | Japan . |
| 5-201024 | 8/1993 | Japan .................................. B41J 2/175 |

*Primary Examiner*—N. Le
*Assistant Examiner*—Shih-Wen Hsieh
*Attorney, Agent, or Firm*—Rader, Fishman & Grauer; Ronald P. Kananen

[57] ABSTRACT

An ink jet printer and a head device of the ink jet printer wherein there are provided a plurality of printer heads each having N nozzles that are arrayed in the sub-scanning direction at an interval of K pixels for a pre-set resolution, where K/N is an irreducible fraction. The printer heads are each arranged so that the nozzles are disposed along the main scanning direction depending on the colors of the emitted ink. The printer heads are also arranged with a shift of L pixels relative to one another in the sub-scanning direction. During one scanning in the main scanning direction of the printer head, only one color ink is recorded (deposited) on the same line of a recordable member to prevent the second color ink from being recorded before drying of the first color ink to achieve printing of a picture of high picture quality. By arranging the printer heads with a step-like shift of L pixels so that L<N, the head device may be rendered smaller in size than the conventional head device. In particular, if a large number of nozzles are provided for high-speed printing, this effect becomes more outstanding.

5 Claims, 6 Drawing Sheets

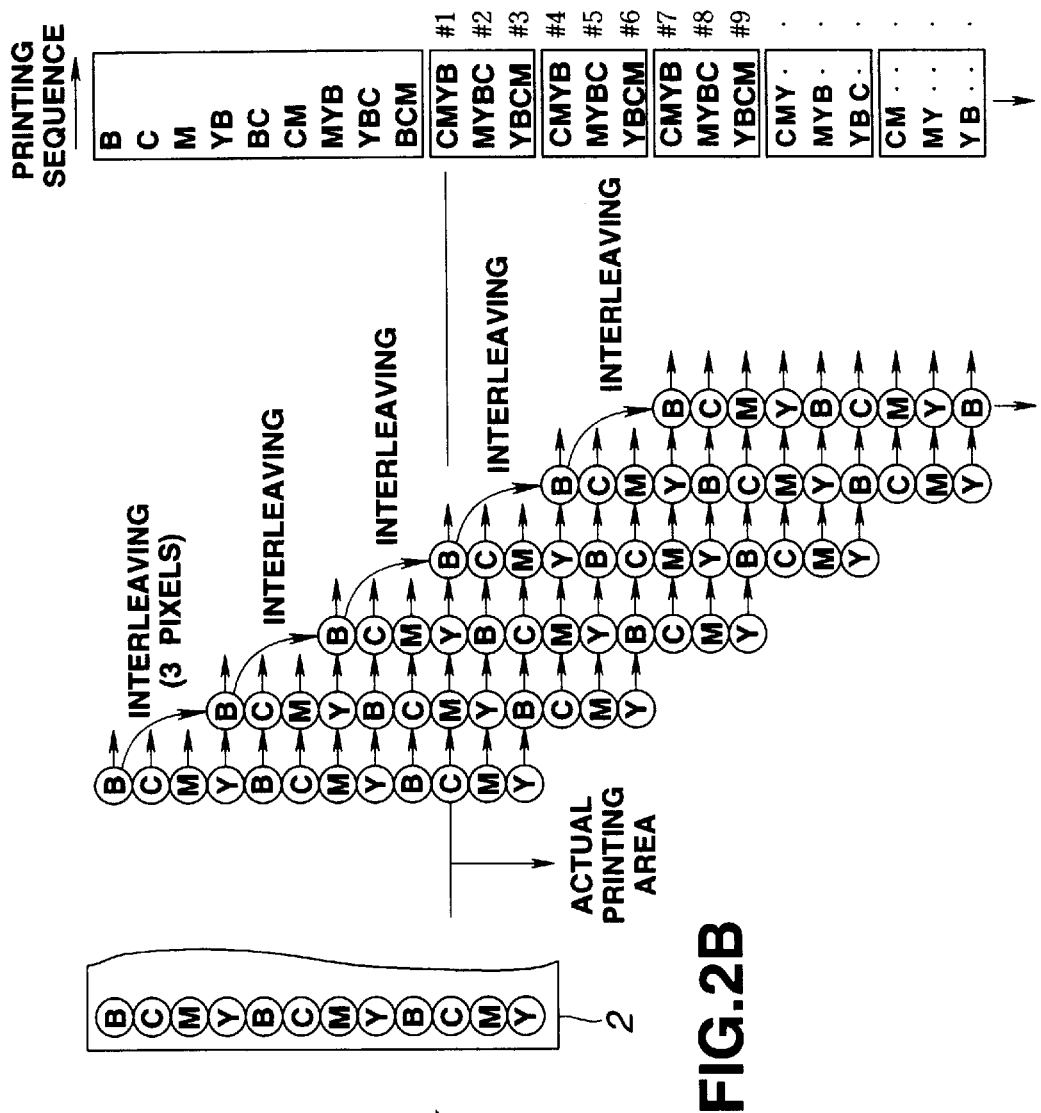
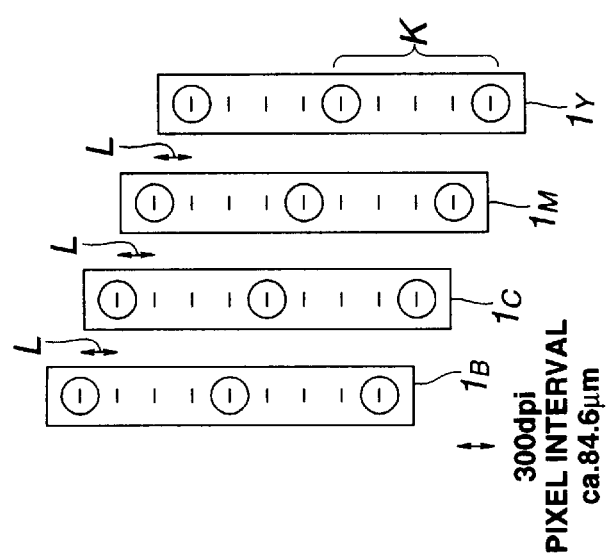
FIG. 2C
FIG. 2B
FIG. 2A

INK JET PRINTER AND ITS HEAD DEVICE

TECHNICAL FIELD

This invention relates to an ink jet printer and its head device. More particularly, it relates to a head device in which printer heads associated with plural colors are arrayed with an offset of L pixels in a sub-scanning direction.

BACKGROUND ART

In an on-demand type ink jet printer, ink droplets are ejected from a nozzle to be deposited on a recording member, such as a paper sheet or film, for regenerating an image on the recording member. The ink jet printer has recently come into widespread use because it is amenable to reduction in size and cost. The method of ejecting ink droplets from the printer head nozzle is classified into a method of pressurizing the ink by displacement of piezo-electric elements and a method of heating and vaporizing the ink in the nozzle by heating elements for using the pressure of the generated gas bubbles. None of these methods can vary the concentration of the ink deposited on the recording member, as a principle, such that half-tone gradation cannot be expressed in terms of ink dots (pixels) as units.

As a method for basically solving the above-mentioned problem inherent in the demand type ink jet printer, the present Assignee has developed a two-liquid mixing type printer and disclosed it in Japanese Laid-Open Patent 5-201024. This two-liquid mixing type printer is designed so that ink and a dilution liquid such as a transparent solvent are mixed together at a mixing ratio related to picture data, directly before jetting the ink, to produce a diluted ink, which is immediately jetted from the nozzle so as to be deposited on the recording member. This printer is referred to hereinafter as a carrier jet printer for demarcation from the two-valued printing on-demand type ink jet printer which cannot express the half-tone gradation. With the carrier jet printer, the ink concentration can be controlled from one discharged ink droplet to another for varying the gradation from one dot on the recording member to another.

For realizing color printing of plural colors in the on-demand type ink jet printer or the above-mentioned carrier jet printer, there is a method including arraying plural printer heads discharging inks of different colors on a straight line along the main scanning direction, moving these printer heads as one along the main scanning direction and superimposing color inks at the same position on the recording paper sheet as the recording member for printing multi-color images.

As a second method, there is disclosed in Japanese Patent Publication 3-76226 such a method in which plural printer heads, each having N nozzles at an interval of K pixels in a pre-set resolution in the sub-scanning direction, are arrayed in steps with an offset of L pixels in the sub-scanning direction, where L is an integer multiple of N, and in which these printer heads are moved as one in the main scanning direction while skipping (L-1) pixels in the sub-scanning direction for printing a multicolor image by superimposing color inks at the same position on the recording paper sheet.

With the first method, since the nozzles associated with different colors are arrayed on a straight line in the main scanning direction, the inks of other colors are superimposed on the previously deposited ink which has not been dried sufficiently. The result is bleeding of the discharged color inks thus lowering the quality of the discharged color inks, and hence the quality of the image printed on the recording paper sheet. Moreover, if the printing, that is ink emission, is done in each of the forward and backward movements in the main scanning direction, the ink super-position sequence is inconveniently reversed in the forward and reverse movements of the print heads.

With the second method, the inconvenience proper to the first method can be obviated, however, the amount of offset in the sub-scanning direction of the print heads needs to be an integer number multiple of the number of nozzles N in each print head. Therefore, if the number of nozzles are increased for increasing the printing speed in currently available printer heads, four-color print heads are arrayed with an offset in the sub-scanning direction, the amounts of offsets L of the printer heads become as large as N, 2N, 3N, . . . thus increasing the size in the sub-scanning direction of the four-color print heads in their entirety. In addition, the head movement unit (carriage) for moving the print heads is also increased in size.

In view of the above inconveniences, an object of the present invention is to provide a head device which may be more compact than the conventional head device even if a large number of nozzles are annexed for high speed printing, and an ink jet printer employing such head device.

DISCLOSURE OF THE INVENTION

A head device for an ink jet printer according to the present invention includes a plurality of printer heads each having N nozzles arrayed in the sub-scanning direction at an interval of K pixels for a pre-set resolution, where K/N is an irreducible fraction. Each printer head is arranged so that the nozzles are disposed along the main scanning direction depending on the colors of the emitted ink. The printer heads are also arranged with a shift of L pixels relative to one another in the sub-scanning direction.

An ink jet printer according to the present invention includes a head device having a plurality of printer heads each having N nozzles arrayed in the sub-scanning direction at an interval of K pixels for a pre-set resolution, where K/N is an irreducible fraction. Each printer head is arranged so that the nozzles are disposed along the main scanning direction depending on the colors of the emitted ink, the printer heads being also arranged with a shift of L pixels relative to one another in the sub-scanning direction, the ink jet printer also includes signal processing means for re-arraying picture data in the sub-scanning direction on the line basis and outputting the re-arrayed data and color correction means for calculating the combination of the maximum recording sequence that can be taken during recording by the head device of each line constituting a picture drawn on a recordable member for picture data outputted by the signal processing means for correcting the colors of the picture data based on the calculated results. The printer heads are each arranged so that the nozzles are disposed along the main scanning direction depending on the colors of the emitted ink, the printer heads also being arranged with a shift of L pixels relative to one another in the sub-scanning direction.

With the ink jet printer and the head device therefor, according to the present invention, the printer heads are arrayed with a shift of L pixels from each other, so that L<N.

BRIEF DESCRIPTION OF THE DRAWINGS

FIG. 2 shows an illustrative arrangement of plural nozzles of a print head embodying the present invention.

BEST MODE FOR CARRYING OUT THE INVENTION

Figure 1:
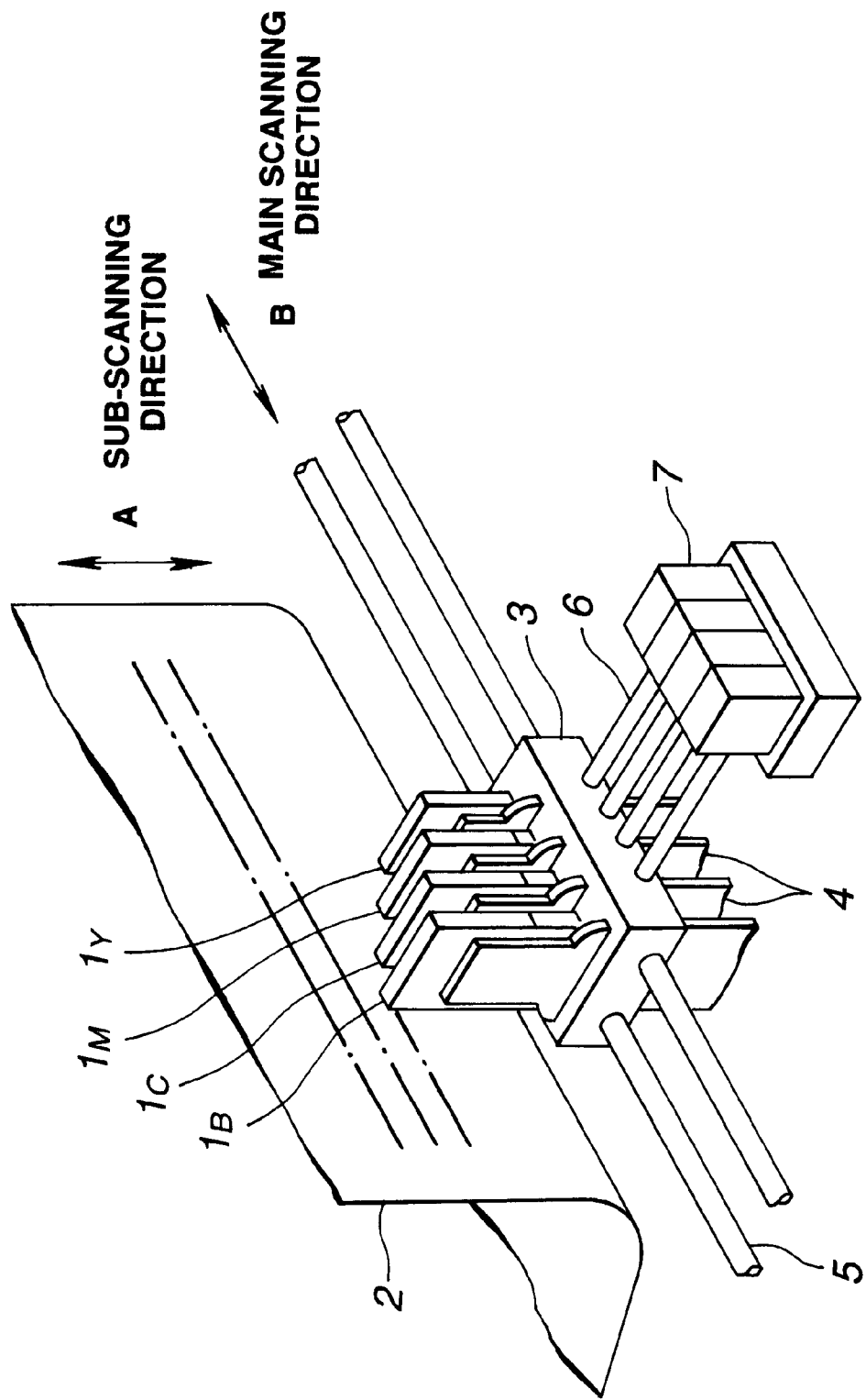
FIG. 1 is a perspective view showing the structure of essential portions of an ink jet printer embodying the present invention.

Referring to the drawings, an ink jet printer and its head device of the present invention will be explained in detail. In the following embodiments, the present invention is directed to an ink jet printer capable of expressing the in-dot gradation, as typified by the above-mentioned carrier jet printer, and an ink jet printer for bi-valued printing (this type of the ink jet printer being hereinafter referred to as an on-demand type ink jet printer). For details of the print head of the carrier jet printer, see the above referenced Japanese Laid-open Patent No.5-201024.

Referring to FIG. 1, the ink jet printer according to the present invention includes printer heads $1_B$, $1_C$, $1_M$ and $1_Y$ for jetting inks of black (B), cyan (C), magenta (M) and yellow (Y), respectively, with each print head having N nozzles. The ink jet printer also has a recording paper sheet 2 as a recording member fed in the sub-scanning direction, and a carriage unit 3 carrying the print heads $1_B$ to $1_Y$ and designed for driving these printer heads $1_B$ to $1_Y$ in the main scanning direction. The ink jet printer also has a flexible print board 4 for furnishing driving signals for driving the printer heads $1_B$ to $1_Y$ and a guide rail 5 for guiding the carriage unit 3. The ink jet printer additionally has a set of ink tanks 7 for supplying the inks and dilution liquids to the printer heads $1_B$ to $1_Y$.

The ink tank set 7 furnishes the inks of black (B), cyan (C), magenta (M) and yellow (Y) and dilution liquids via ink supply pipe 6 to the respective print heads $1_B$ to $1_Y$.

The print heads $1_B$ to $1_Y$ are each comprised of an ink jet type print head employing, for example, piezoelectric elements or heating elements, and are each provided with N ink-jetting nozzles. These print heads $1_B$ to $1_Y$ are designed to mix the inks of black (B), cyan (C), magenta (M) and yellow (Y) with the dilution liquid, if need be, based on driving signals furnished from, for example, a modulation vibrator driving unit 25 and a discharging vibrator driving unit 26 shown, for example, in FIG. 6, via flexible print board 4, for selectively emitting the resulting mixture to the recording paper sheet 2, as the recording member, in order to effect picture printing.

Figures 3A, 3B:
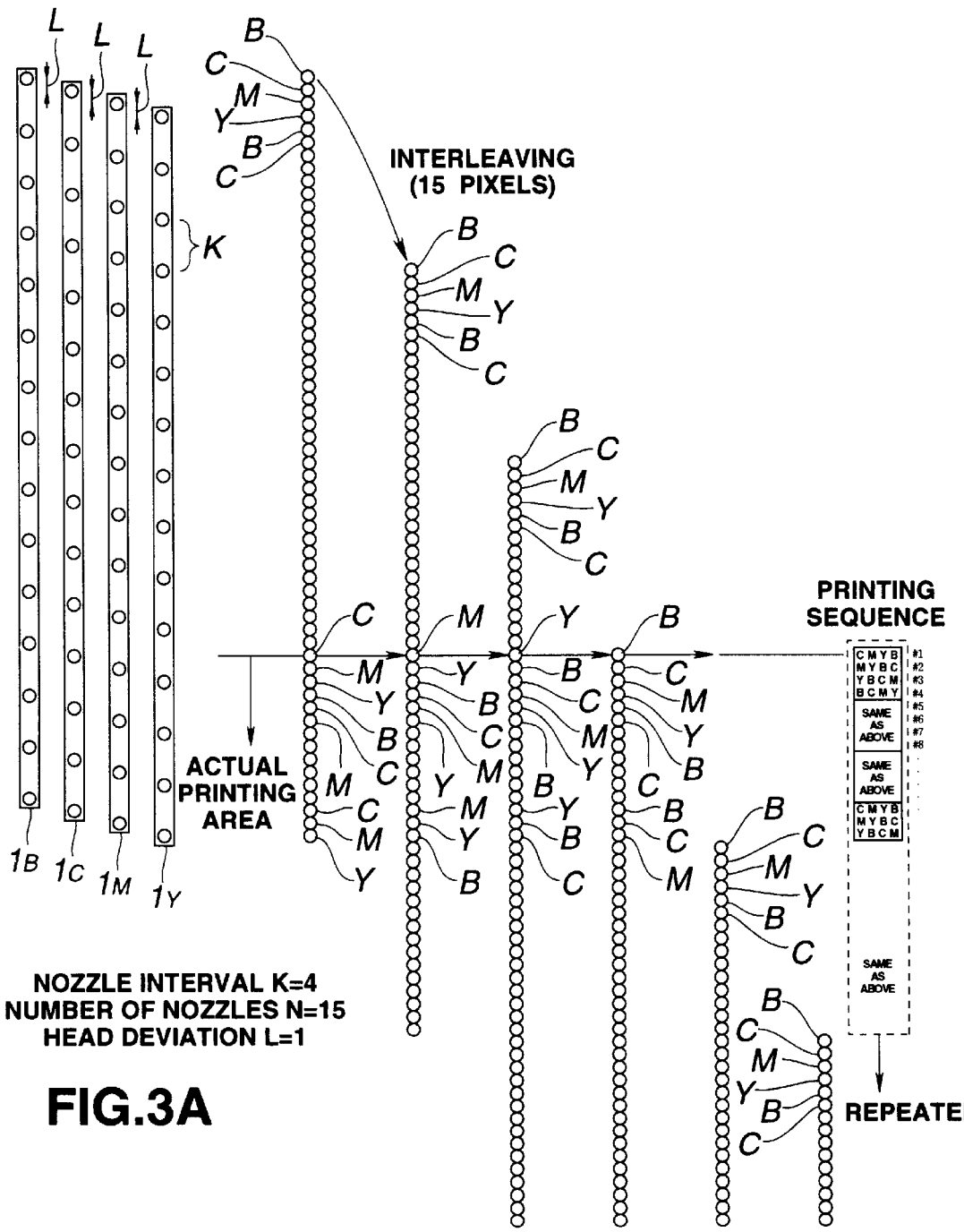
FIG. 3 shows an illustrative arrangement of plural nozzles of a print head embodying the present invention.
Figure 6:
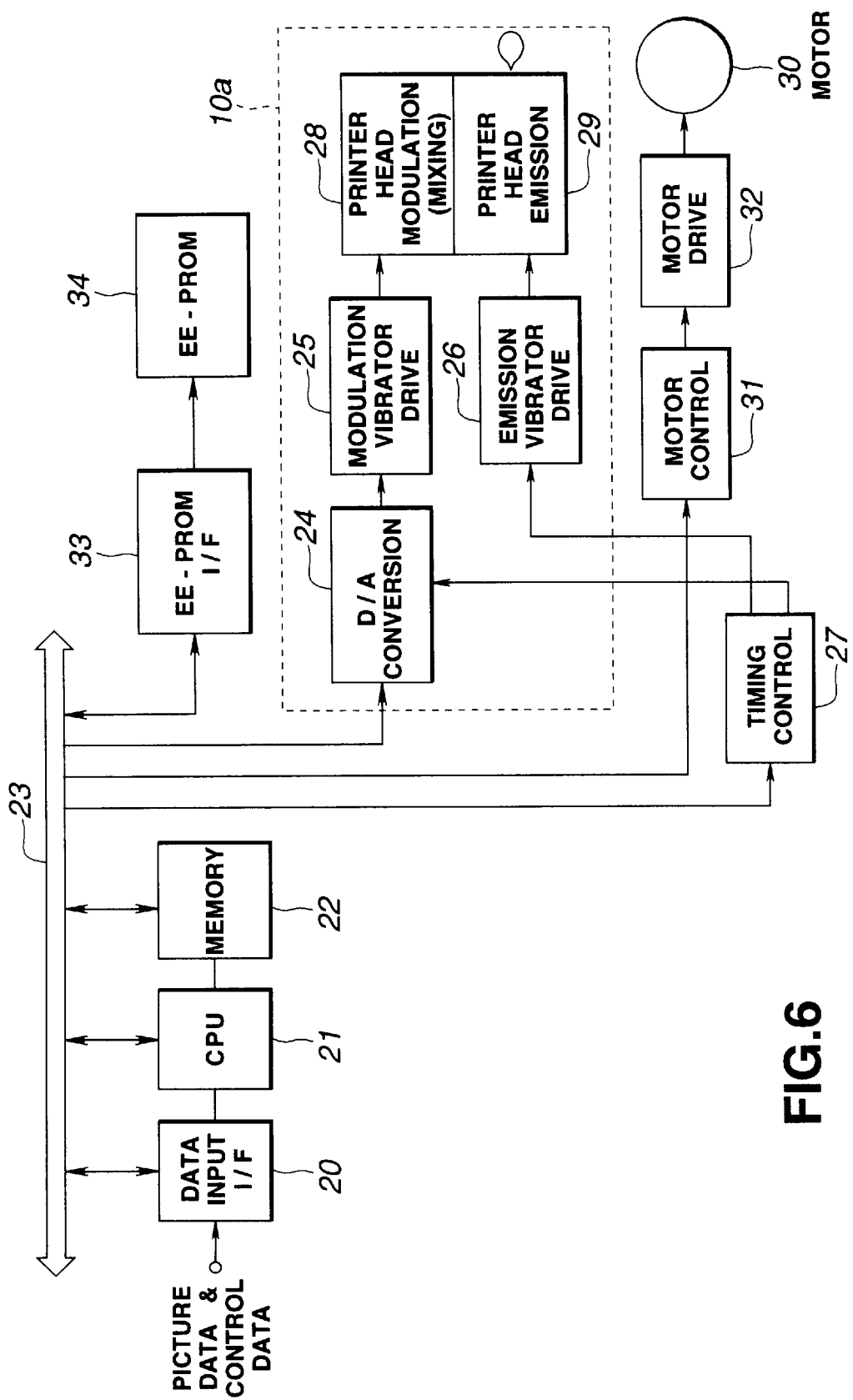
FIG. 6 is a block diagram showing an illustrative structure of the printer shown in FIG. 4.

The carriage unit 3, having the printer heads $1_B$ to $1_Y$ loaded thereon, is driven along the guide rail 5 by a pulse motor of a motor unit 30 shown for example in FIG. 6, for moving the printer heads $1_B$ to $1_Y$ in unison in the forward direction or in reverse as indicated by arrow B in FIG. 1. After the forward or reverse movement of the print heads $1_B$ to $1_Y$ comes to a close, the recording paper sheet 2 is fed in the sub-scanning direction as indicated by arrow A in FIG. 1 a distance corresponding to a number of pixels corresponding in turn to the number of nozzles N of the printer heads $1_B$ to $1_Y$, by a pulse motor of the motor unit 30, under control by a CPU 21 as later explained with reference to FIG. 1. Thus the printer heads $1_B$ to $1_Y$ relatively skip-scan (interleave) the recording paper sheet 2 for emitting the inks of respective colors at the positions where the nozzles are located. This achieves color printing on the recording paper sheet 2. The end of the forward or backward movement of the printer heads $1_B$ to $1_Y$, that is the end of a scanning operation in the main scanning direction, can be detected by detecting the arrival of the carriage unit 3 at the end position of the forward or backward movement of the carriage unit 3 by a detection mechanism (not shown) or by detecting the end of supply of printing data (recording picture data) for each scanning operation to the printer heads $1_B$ to $1_Y$ by the CPU 21. —The printer heads $1_B$ to $1_Y$ will be explained in detail by referring to FIGS. 2A to 2C, 3A and 3B. FIGS. 2A to 2C show an illustrative example of printer heads $1_B$ to $1_Y$ each having the number N of nozzles equal to 3, while FIGS. 3A and 3B show an illustrative example of printer heads each having the number N of nozzles equal to 15. FIG. 2A shows the relative position of each of the printer heads $1_B$ to $1_Y$, FIG. 2B shows pixels(dots) on the recording paper sheet 2 formed by one scanning operation in the main scanning direction and FIG. 2C shows the sequence of superposition of color inks of pixel rows (lines) in the main scanning direction in the interleaving scanning in the sub-scanning direction, that is the recording sequence. In FIG. 2C, the recording start positions of the printer heads $1_B$ to $1_Y$ are shown changed from one scanning operation to another for ease of understanding.

In each of the printer heads $1_B$ to $1_Y$ for black (B), cyan (C), magenta (M) and yellow (Y), according to the present invention, N nozzles are arrayed in the sub-scanning direction, at a K-pixel interval at a pre-set resolution, where K/N represents an irreducible fraction. These printer heads $1_B$ to $1_Y$ are mounted on the carriage unit 3 with an offset of L pixels in the sub-scanning direction, where L<N. That is, while the amount of offset L of the printer heads is set to an integer number multiple of the number of nozzles N in the technique disclosed in the above-mentioned Japanese Laid-open Patent 3-76226 (second method), the amount of offset L of the printer heads $1_B$ to $1_Y$ according to the present invention is less than the number of nozzles N.

If, for example, the pixel interval for the pre-set resolution is "1" and three nozzles are arranged in each of the printer heads $1_B$ to $1_Y$ (N=3), the nozzle interval K is, for example, 4, in meeting with the condition that K/N is an irreducible fraction. Specifically, with the resolution of 300 dpi and the pixel interval of approximately 84.6 μm set to "1", as shown in FIG. 2A, the printer heads $1_B$ to $1_Y$ are each provided with four nozzles with an interval of four pixels (K=4, that is 84.6 μm×4=0.34 mm), while the printer heads $1_B$ to $1_Y$ are mounted in a step fashion on the carriage unit 3 with an offset of one pixel (L=1, that is 84.6 μm). For example, 15 (N=15) nozzles are arranged at an interval of 4 (K=4) pixels in each of the printer heads $1_B$ to $1_Y$ as shown in FIG. 3A, while the printer heads $1_B$ to $1_Y$ are mounted in a step fashion with an offset of 1 pixel (L=1) in the sub-scanning direction. That is, in each of the above illustrative embodiments, the amount of offset L of each of the printer heads $1_B$ to $1_Y$ is less than the number of nozzles N (3 or 15). It should be noted that the amount of offset L of the printer heads $1_B$ to $1_Y$ is not limited to 1 pixel. For example, if the number of nozzles N is 3, the amount of offset L may be 2 pixels, whereas, if the number of nozzles N is 15, the amount of offset L may be any one of 2 to 14. That is, since the amount of offset L of the printer heads $1_B$ to $1_Y$ according to the present invention is less than the number of nozzles N, the overall size in the sub-scanning direction can be selected to be smaller than that of the conventional print head, thus enabling the carriage unit 3 to be reduced in size.

If the printer heads $1_B$ to $1_Y$, each having three nozzles, are moved in the main scanning direction to eject the ink, the pixels arrayed in a row in the sub-scanning direction of the recording paper sheet 2 are black (B), cyan (C), magenta (M) and yellow (Y), repeated thrice in the sub-scanning direction, as shown for example in FIG. 3B. The printer heads $1_B$ to $1_Y$ are hereinafter referred to as printer heads 1 for brevity. If the printer heads 1 are moved in the forward and reverse directions in the main scanning direction for emitting the ink in both directions, with 3-pixel interleaving in the sub-scanning direction, the ink is deposited in the sequence of cyan (C), magenta (M), yellow (Y) and black (B) in the row (line) #1 arrayed in the main scanning direction, while the ink is deposited in the sequence of magenta (M), yellow (Y), black (B) and cyan (C), in the row (line) #2 and in the sequence of yellow (Y), black (B), cyan (C) and magenta (M), in the row (line) #3, as shown in FIG. 2C. The next following rows #4, #5 and #6, . . . represent repetitions of the rows #1, #2 and #3 (the rows are referred to hereinafter as lines). That is, the recording sequence is not changed for the forward and reverse movements of the printer heads 1. The recording sequence by the printer heads $1_B$, $1_C$, $1_M$ and $1_Y$ is changed from line to line, however, this is repeated every three lines. The interval of repetition every three lines is 0.254 mm (=8.46 $\mu$m×3), such that the difference in picture quality from line to line, caused by different superposition sequence of color inks, is averaged out and becomes less perceptible on visual inspection of the image reproduced on the recording paper sheet 2. However, depending on the types of printed picture, there are occasions wherein the difference in picture quality from line to line, caused by different superposition sequence of color inks, my be perceptible. In such case, the picture data is color-compensated, as later explained, before proceeding to picture printing.

On the other hand, if the printer heads 1, each having 15 nozzles as shown for example in FIG. 3A, are moved in the forward and reverse directions in the main scanning direction for emitting the ink in both directions, with 15-pixel interleaving in the sub-scanning direction, the ink is deposited in the sequence of cyan (C), magenta (M), yellow (Y) and black (B) in the line #1 and the ink is deposited in the sequence of magenta (M), yellow (Y), black (B) and cyan (C), in the line #2, while the ink is deposited in the sequence of yellow (Y), black (B), cyan (C) and magenta (M), in the line #3 and the ink is deposited in the sequence of black (B), cyan (C) and magenta (M) and yellow (Y), in the line #4, as shown in FIG. 3B. The four lines #5 to #8 and the four lines #9 to #12 are repetitions of the lines #1 to #4, while the three lines #13 to #15 are a repetition of the lines #1 to #3. The ensuing lines #16, #17, #18, . . . represent repetitions of the lines #1 to #15. That is, the recording sequence is not changed in the forward and reverse movements of the printer heads 1. Although the recording sequence by the printer heads $1_B$, $1_C$, $1_M$ and $1_Y$ is changed from line to line, this change is repeated thrice on the four-line basis and once on the three-line basis. Therefore, if the difference in picture quality from line to line, caused by the different superposition sequence of the color inks due to the different sorts of the printed picture, is perceptible, as in the case of the print head 1 having the three nozzles, picture printing is carried out after color correction, as later explained.

Figure 4:
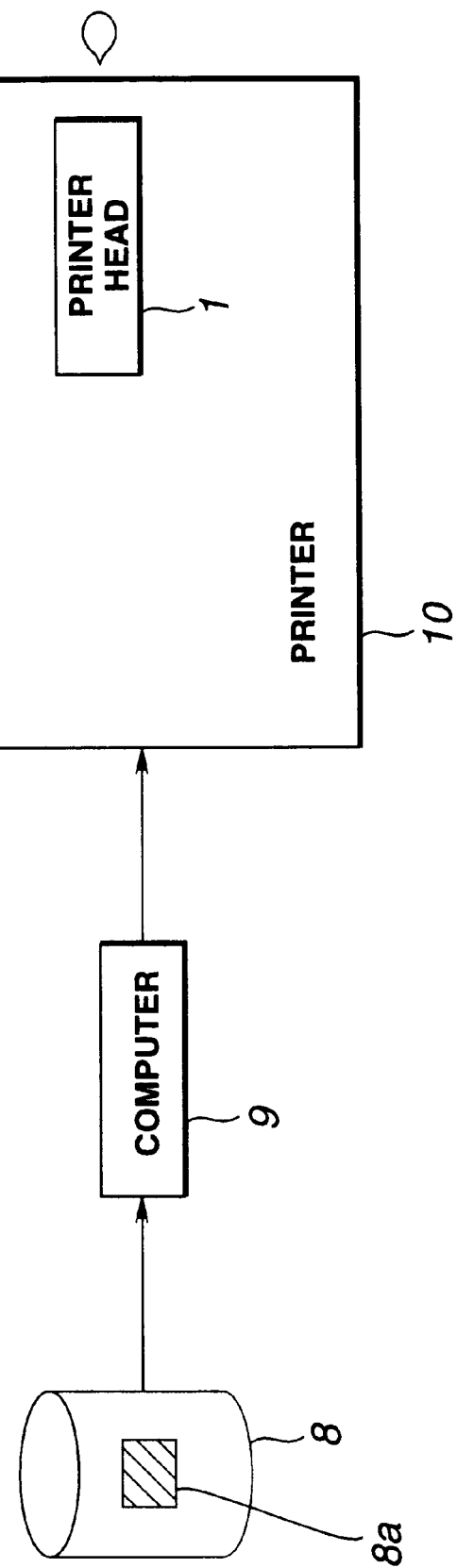
FIG. 4 is a block diagram showing the structure of a computer system employing the ink jet printer shown in FIG. 1.

The structure of the computer system employing the above-mentioned ink jet printer is explained by referring to FIG. 4. The computer system has a storage device 8 having stored therein a picture file 8a made up of picture data, a computer device 9 for signal processing such as color correction, on picture data, and a printer 10 having a print head 1.

The storage device 8 includes a hard disc device or an optical disc device, and reads out the picture file 8a composed of R-, G- and B-components recorded on the discs to supply the read-out data to the computer device 9. These R-, G- and B-components are sometimes referred to herein as picture data. The computer device 9 is comprised of, for example, a personal computer, and processes picture data of the picture file 8a with signal processing as later explained for conversion into printing picture data for driving the printer heads 1. The computer device 9 furnishes the printing data to the printer 10 every other line. The printer 10 uses the printer heads 1 and prints the image on the recording paper sheet 2 based on the picture printing data.

As an interface between the computer device 9 and the printer 10, a parallel interface such as IEEE Std.1284, commonly termed Bi-Centronics, or SCSI 2, is used. In the present embodiment, parallel interfacing is used in view of an enormous amount of transferred data.

Figure 5:
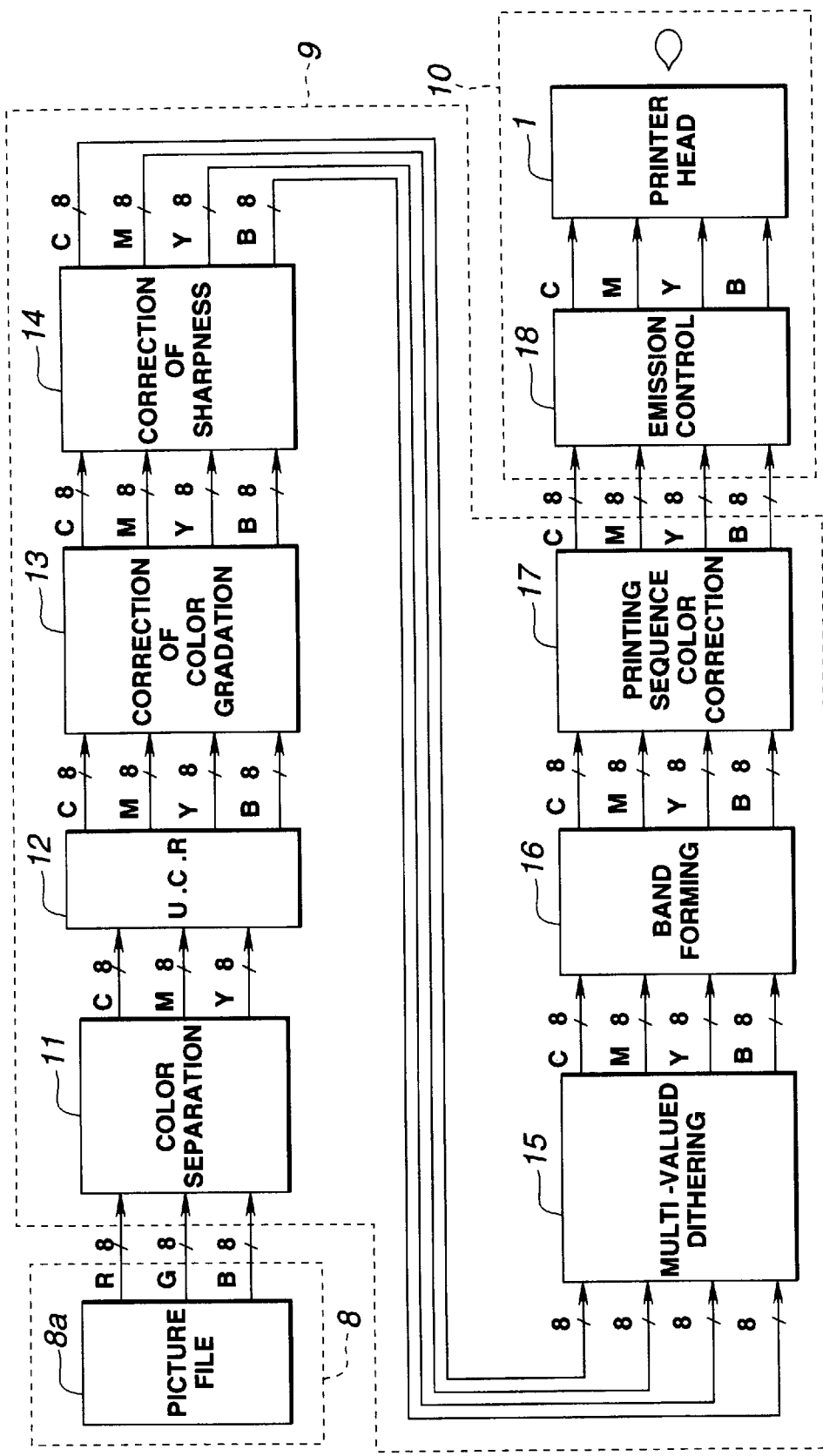
FIG. 5 illustrates signal processing by the computer device shown in FIG. 4.

Referring to FIG. 5, signal processing by the computer device 9 is explained. This signal processing is carried out by a structure shown in FIG. 5. The structure includes a color separation processing unit 11 for generating data of a cyan (C) component, a magenta (M) component and a yellow (Y) component, and an under-color removal (UCR) unit 12 for generating data of black (B) component. The structure also includes a color gradation correction unit 13 for signal processing, such as color correction or γ correction for the generated component data, and a sharpness correction unit 14 for signal processing, such as sharpness processing, for the γ-corrected components. The structure also includes a multi-value forming dithering processor 15 on the data of the respective components processed with sharpness processing, and a band forming processor 16 for re-arraying the data of the respective dithered components in the recording sequence on the print head 1. The structure further includes a printing sequence color correction processor 17 for correcting the difference in picture quality ascribable to the differential color ink superposition sequence from line to line.

The color separation unit 11 converts the R-component data, G-component data and B-component data, each made up of, for example, 8 bits, into cyan (C) component data, magenta (M)-component data and yellow (Y) component data, which are complementary colors of the three prime colors (red, green and blue), each made up of, for example, 8 bits. The UCR processor 12 generates black (B) component data from these component data. Although the print head $1_B$ is provided in the present embodiment, it should be noted that the UCR processor 12 can be dispensed within the printer 10 without the print head $1_B$.

The color gradation correction unit 13 processes the cyan (C) component data, magenta (M) component data and yellow (Y) component data, supplied from the UCR processing unit 12, with color correction or γ correction, for color gradation correction for regenerating the color faithful to the manuscript (original picture) into which spectroscopic properties of color toners, color dyes and filters have been taken into account. It should be noted that color correction processing for correcting the difference in picture quality caused by the difference in the color ink superposition sequence is not included in the signal processing performed by the color gradation correction unit 13.

The sharpness correction unit 14 processes the γ-corrected data of the respective components from the color gradation correction unit 13 with picture sharpness processing (accentuation of high frequency range, MTF correction or blur correction) or noise removal (smoothing or removal of under color portions.

The multi-value forming dithering processor 15 processes the data of the respective components from the sharpness correction unit 14 with multi-gradation dithering, such as multi-gradation error diffusion method for non-reproducible portions, based on, for example, the maximum number of gradations in a dot in, for example, a carrier jet printer. As for the dithering employing a multi-valued gradation error diffusion method, see, for example, the Japanese Laid-Open Patent 7-332139 filed on Dec. 20, 1995 by the present Assignee.

The band-forming processor 16 re-arrays the data of respective components from the multi-value forming dithering processor 15 processed with multi-gradation processing, on the line-basis, for setting up the recording sequence of the print heads 1.

If the line-based picture quality difference due to the different ink emission sequence of each of the printer heads $1_B$ to $1_Y$ from line to line and to different color ink superposition sequence from line to line is apparent on visual inspection of a picture regenerated on a recording paper sheet 2, the printing sequence color correction processor 17 is responsive to user actuation for performing color correction processing suited to the ink superposition sequence of each line on data of respective components supplied from the band-forming processor 16. The maximum number of recording sequences that can be assumed in actual picture printing by the printer heads 1 calculated by the permutation $_NP_N$, where N is the number of heads, or the color correction methods optimum for the recording sequence of the respective color inks corresponding to the preset sorts of the recording sequences, are recorded in an EEPROM 34 as later explained with reference to FIG. 6. The printing sequence color correction processor 17 judges, based on the position of the picture printed on the recording paper sheet 2, the sequence in which the color inks are recorded, reads out the color correction processing method corresponding to the recording sequence from the EEPROM 34, corrects data of the respective components using this color correction processing method and routes the data as color printing data to the printer 10. Meanwhile, the color correction processing methods are previously found by experiments and stored in the EEPROM 34.

The computer device 9 generates picture printing data for each scanning in the main scanning direction of the printer head 1 as described above and transfers the picture printing data in synchronism with the actual picture printing operation of the printer 10. The printer 10 includes an emission controller 18 and the above-mentioned printer head 1. The emission controller 18 performs the operation of mixing the ink with a dilution liquid as disclosed in the above-referenced Japanese Patent Application 5-201024, based on the picture printing data supplied form the printing sequence color correction processor 17 of the computer device 9 for emitting ink liquid drops from the printer head 1.

Meanwhile, the color correction processing performed by the printing sequence color correction processor 17 can be executed if the emission sequence of the respective color inks is known and hence can be executed by the color separation processor 11 and the CPR processor 12. In this case, the printing sequence color correction processor 17 can be omitted for reducing the signal processing time required in the computer device 9. In addition, the data accuracy in calculation can be prevented from being lowered.

In the ink jet printer of the instant embodiment, the color ink superposition sequence is not changed for the forward and return strokes of the main scanning direction of the printer head 1. However, the color ink superposition sequence is changed from line to line depending on the line position on the recording paper sheet 2, such change being repeated in terms of plural lines as a unit. As may be seen from FIGS. 2C or 3B, the recording position of a picture on the recording paper sheet 2 can be identified by the number of interleaving scanning operations in the sub-scanning direction of the printer head 1 since start of printing and by the number of the line being scanned. Thus, a suitable color correction processing method is selected from among a plurality of the color correction processing methods depending on the color ink superposition sequence of the target line determined by the recording position of a picture on the recording paper sheet 2. The plurality of the color correction processing methods, previously stored as a program in the computer device 9, may also be deemed to be plural sorts of parameters in the correction processing in a sole color correction processing method.

Specifically, with the values of the data of the cyan (C) component, magenta (M) component and the yellow (Y) component, of C, M and Y, respectively, and with the values of the data of the components after color correction processing of $C_0$, $M_0$ and $Y_0$, respectively, the values of the color correction processed component data are found by the following equations:

$$C_0 = c_y Y + c_m M + C$$

$$M_0 = m_y Y + M + m_c C$$

$$Y_0 = Y + y_m M + y_c C$$

where $c_y$, $c_m$, $m_y$, $m_c$, $y_m$ and $y_c$ are masking coefficients based on the color ink superposition sequence, that is parameters. The values of these parameters in the color correction processing method are determined in advance based on the results of experiments because the values of these parameters are varied with changes in surface characteristics of the recording paper sheet used or with ink characteristics, that is with use of different ink types or different recording paper sheets by the user. Although the color correction processing is carried out by calculation of the equation (1), it is also possible to store the results of calculations as a so-called lookup table in, for example, a memory of the computer device 9 and to read out the results of the calculations from the lookup table based on the data of the respective components prior to the color correction processing and the recording positions on the recording paper sheet 2. Although the foregoing description has been made on signal processing operations by the computer device 9, one or more of these signal processing operations may be performed on the side of the printer 10.

Referring to FIG. 6, an illustrative structure of the printer 10 having the function of the band forming processor 16 and the printing sequence color correction processor 17 is now explained. A head circuit section 10a shown by a broken line in FIG. 6 corresponds to one of the nozzles of the printer head 1. Although a number of head circuit sections 10a equal to the number of the nozzles is provided in actuality, only one head circuit section 10a is shown for simplifying the structure. In FIG. 6, the function of the band-forming processor 16 for interleaving of the printer head 1 and the function of the printing sequence color correction processor 17 on the line basis, among the signal processing functions carried out by the computer device 9, are executed by a CPU 21 in the printer 10.

Referring to FIG. 6, the printer 10 includes a data input interfacing unit (data input I/F) 20, to which are entered data of respective components of cyan (C), magenta (M), yellow (Y) and black (B), supplied from the multi-value forming dithering processor 15 of the computer device 9, and the CPU 21 for executing color correction processing for correcting difference in picture quality due to difference in color ink superposition sequence. The printer 10 also includes a memory 22 having stored therein the program for color correction processing, and a bus 23 for interconnecting the CPU 21 and the memory 22. The printer 10 also includes a D/A converter 24 for converting picture printing data from the CPU 21 into modulation vibrator driving signals and a modulation vibrator driving unit 25 for amplifying the modulation vibrator driving signals from the D/A converter 24. The printer 10 also includes an emission vibrator driving unit 26 for controlling the ink volume based on the modulation vibrator driving signals from the modulation vibrator driving unit 25 and a timing controller 27 for controlling the emission timing of the color inks. The printer 10 also includes a print head modulator (mixer) 28 for controlling the ink concentration and a print head emission section 29 for mixing the color inks and the dilution solution for emitting the resulting mixture. The printer 10 also includes a motor section 30, having, for example, a pulse motor, for moving the recording paper sheet 2, and a motor controller 31 for generating motor driving signals based on motor driving control signals from the CPU 21. The printer 10 also includes a motor driving section 32 for driving the pulse motor of the motor section 30 based on the motor driving signals. The printer 10 also includes an EEPROM I/F unit 33 for reading out parameters for the color correction processing method and an EEPROM 34 having stored therein parameters for the color correction processing method.

If the user prints a desired picture using the computer device 9, such as a personal computer, a print start command is entered, responsive to user actuation, from the computer device 9 to the CPU 21 via data input I/F unit 20 and bus 23.

The memory 22 includes a ROM having pre-stored therein a program for correcting the difference in picture quality ascribable to differences in color ink superposition sequence and a RAM for transient storage of picture printing data or the like. The CPU 21 executes the program stored in the ROM, for example, the program corresponding to the equation (1), for correcting the colors into data of cyan (C), magenta (M), yellow (Y) and black (B) components, as in color correction performed by the printing sequence correction processor 17. In addition, the CPU 21 converts the data of the respective components into picture printing data required for actual printing by the printer head 1 and routes the printing data to the D/A converter 24. Specifically, parameter values as found experimentally and used for the line-based optimum color correction processing method are stored in the EEPROM 34. The CPU 21 reads out the parameters from the EEPROM 34 via EEPROM I/F unit 33, responsive to the picture printing positions on the recording paper sheet 2, and executes the program corresponding to the equation (1) for generating color-corrected data of the respective components for transient storage in the RAM of the memory 22. The CPU 21 also reads out the data of the respective components stored in the RAM on the line basis in synchronism with the main scanning and interleaving sub-scanning of the printer head 1 to supply the read-out data as picture printing data to the D/A converter 24.

The D/A converter 24 converts the printing data supplied from the CPU 21 into voltage levels indicated by the printing data, responsive to the D/A conversion trigger signals supplied from the timing controller 27, for supplying the converted data to the modulation vibrator driving unit 25.

The modulation vibrator driving unit 25 then amplifies the modulation vibrator driving signal to produce a voltage required for driving a modulation piezoelectric vibrator of the printer head modulator 28, that is a piezoelectric element for controlling (quantitating) the amount of the ink mixed with the dilution solution, and routes the resulting signal as the modulation vibrator impression signal to the printer head modulator 28. The printer head modulator 28 validates the modulation vibrator impressing signal supplied within a pre-set time, while invalidating the modulation vibrator impressing signal supplied after this time for driving, for example, the piezoelectric device. This permits the printer head modulator 28 to supply an amount of the ink corresponding to the picture printing data to the printer head emission unit 29.

When the ink quantitation by the printer head modulator 28 has come to a close, the timing controller 27 furnishes an emission timing signal to an emission vibrator driving unit 26. The emission vibrator driving unit 26 amplifies the emission timing signal to a voltage required for displacing the emission piezoelectric vibrator, that is a piezoelectric device for emitting the dilution solution, and furnishes the amplified signal as the emission vibrator impressing voltage to the printer head emission unit 29, which then mixes the quantitated amount of the ink of the printer head modulator 28 with the dilution solution and emits the mixed ink by the emission vibrator impressing voltage via orifice plate. This allows the ink of the desired concentration to be deposited on the dot (pixel) basis on the recording paper sheet 2.

The above-described ink emission operation is carried out in synchronism with the movement of the printer head 1 in the main scanning direction. Specifically, the CPU 21 sequentially reads out picture printing data stored in the memory 22 and routes the read-out data over bus 23 to the D/A converter 24, while furnishing to the motor driving unit 31 a motor driving control signal for moving the printer head 1 in the main scanning direction. The motor controller 31 generates, based on the motor driving control signal for the main scanning direction, supplied from the CPU 21, pulse-shaped motor driving signals for moving the printer head 1 on the pixel basis in the main scanning direction, and routes the motor driving signals to the motor driving unit 32. The driving unit 32 amplifies the motor driving signals for driving the pulse motor designed for moving the printer head 1 in the main scanning direction. This moves the printer head 1 in the forward direction or in reverse so that 15 lines (for the printer head shown in FIG. 2A) or 63 lines (for the printer head shown in FIG. 3A) of the first color ink dots are formed simultaneously on the recording paper sheet 2, although the colors differ in the neighboring lines.

If the ink dots have been formed on the recording paper sheet 2 by first scanning in the main scanning direction of the printer head 1, the CPU 21 supplies to the motor controller 31 the motor driving control signal for feeding the recording paper sheet 2 by, for example, three pixels, in the sub-scanning direction. Based on the motor driving control signals in the sub-scanning direction, supplied by the CPU 21, the motor controller 31 generates pulse-shaped motor driving signals which feed the recording paper sheet 2 on the three pixel basis in the sub-scanning direction and routes the motor driving signals to the motor driving unit 32. The motor driving unit amplifies the motor driving signals to drive a paper-feed pulse motor. The result is that the recording paper sheet 2 is moved by three pixels in the sub-scanning direction relative to the printer head 1. The above-described sequence of operations is repeated for forming dots with sequentially superposed ink on the recording paper sheet 2, as shown in FIGS. 2C or 3B. That is, with the printer 10, the time interval of moving the recording paper sheet 2 in the sub-scanning direction exists since emission of the first color ink until emission of the second color ink so that the second color ink is deposited after drying of the first color ink to prevent mixing of the two inks. Moreover, by correcting the difference in picture quality caused by different color ink superposition sequence from line to line, it becomes possible to print a high-quality picture.

The foregoing description has been made with reference to an on-demand type ink jet printer capable of representing in-dot gradation. The present invention can, however, be applied to an on-demand ink jet printer capable of performing two-valued printing.

The difference between the above-described carrier jet printer and the ink jet printer with two-valued printing resides only in the structure of the printer head 1 and the manner of signal processing in the computer device 9, no matter whether the force of emitting the ink is produced by displacement of the piezoelectric device represented by the piezoelectric element or by bubbles generated on heating the heating device, such that the ink jet printer with two-valued printing is similar in operation to the carrier jet printer except that the ink jet printer performs the two-valued operation, namely the operation of emitting the ink or the operation of not emitting the ink.

In the case of the ink jet printer with two-valued printing, signal processing by the computer device 9 shown in FIG. 5 switches from the multi-gradation dithering by the multi-valued dithering unit 15 to the two-valued dithering, with the processing subsequent to the two-valued dithering being carried out using data of 1 bit/1 color and 4 colors/1 pixel. The color correction processing by the printing sequential color correction processor 17 is carried out upstream of the two-valued dithering and can be performed in combination with the color gradation correction processing by, for example, the color gradation correction unit 13. This eliminates line-to-line picture quality difference caused by different line-based color ink superposition sequence even with the ink jet printer with two-valued printing.

The present invention is not limited to the above-mentioned embodiments. For example, the present invention can be applied to a variety of ink jet printers, such as, for example, a dot size modulation type ink jet printer or a concentration modulation system ink jet printer.

Industrial Applicability

As will be apparent from the above description, an ink jet printer and a head device of the ink jet printer are provided wherein there are provided a plurality of printer heads each having N nozzles that are arrayed in the sub-scanning direction at an interval of K pixels for a pre-set resolution, where K/N is an irreducible fraction. The printer heads are each arranged so that the nozzles are disposed along the main scanning direction depending on the colors of the emitted ink. The printer heads are also arranged with a shift of L pixels relative to one another in the sub-scanning direction. During one scanning in the main scanning direction of the printer head, only one color ink is recorded (deposited) on the same line of a recording member to prevent the second color ink from being recorded before drying of the first color ink to achieve printing of a picture of high picture quality. By arranging the printer heads with a step-like shift of L pixels so that L<N, the head device may be rendered smaller in size than the conventional head device. In particular, if a large number of nozzles are provided for high-speed printing, this effect becomes more outstanding.

I claim:

1. An ink jet printer comprising:

a head device that can be moved relative to a recording member in a main scanning direction and in a sub-scanning direction perpendicular to the main scanning direction to print at least one recorded line on the recording member, said head device including a plurality of printer heads each having N nozzles that emit colored ink, said N nozzles being arrayed in the sub-scanning direction at an interval of K pixels for a pre-set resolution, where K/N is an irreducible fraction;

signal processing means for re-arraying picture data in said sub-scanning direction and outputting the re-arrayed data; and color correction means for reading a maximum number of recording sequences that can be assumed by the re-arrayed data outputted by said signal processing means and printed by said head device for each recorded line on the recording member and correcting colors of the picture data based on read results, said printer heads being arranged so that said nozzles are disposed along said main scanning direction based on the colors of ink emitted from said nozzles, said printer heads also being shifted L pixels relative to one another in said sub-scanning direction.

2. The ink jet printer as claimed in claim 1, wherein said signal processing means includes under-color removing means for extracting black color component data from complementary color data on which the picture data is based.

3. The ink jet printer as claimed in claim 1, wherein said color correction processing means has a memory that stores an optimum color correction processing data corresponding to an ink emission sequence of each of said plurality of printer heads.

4. The ink jet printer as claimed in claim 1 wherein said plurality of printer heads are arranged with a step-like shift of L pixels relative to one another.

5. The ink jet printer as claimed in claim 1 wherein said plurality of printer heads are shifted L pixels relative to one another and wherein L<N.

* * * * *